United States Patent
Yu et al.

(10) Patent No.: US 10,601,306 B1
(45) Date of Patent: Mar. 24, 2020

(54) SYSTEM AND METHOD FOR PROVIDING POWER SURGE PROTECTION IN A POWER SUPPLY UNIT FOR AN INFORMATION HANDLING SYSTEM

(71) Applicant: Dell Products L.P., Round Rock, TX (US)

(72) Inventors: Wei Cheng Yu, New Taipei (TW); Merle Jackson Wood, III, Round Rock, TX (US); Chung-Cheng Liao, Taoyuan (TW); Chi Che Wu, Taipei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/381,252

(22) Filed: Apr. 11, 2019

(51) Int. Cl.
*H02M 1/32* (2007.01)
*G06F 1/26* (2006.01)
*H02M 7/217* (2006.01)
*H02M 3/335* (2006.01)
*H02M 1/00* (2006.01)

(52) U.S. Cl.
CPC .............. *H02M 1/32* (2013.01); *G06F 1/26* (2013.01); *H02M 3/335* (2013.01); *H02M 7/217* (2013.01); *H02M 2001/0048* (2013.01)

(58) Field of Classification Search
CPC .......... H02M 1/08; H02M 1/143; H02M 1/32; H02M 2001/0048; H02M 3/33523; H02M 7/217; G06F 1/26
See application file for complete search history.

(56) References Cited

U.S. PATENT DOCUMENTS

| | | | |
|---|---|---|---|
| 7,095,215 B2 * | 8/2006 | Liu ........................ | H02M 1/32 323/222 |
| 2013/0003421 A1 * | 1/2013 | Fang ................. | H02M 3/33523 363/21.01 |
| 2013/0235626 A1 * | 9/2013 | Jang .................... | H02M 1/4216 363/37 |
| 2018/0069480 A1 * | 3/2018 | Koo .................. | H02M 3/33523 |

* cited by examiner

*Primary Examiner* — Yusef A Ahmed
*Assistant Examiner* — Shahzeb K Ahmad
(74) *Attorney, Agent, or Firm* — Baker Botts L.L.P.

(57) ABSTRACT

A power supply unit for an information handling system, including a filter module configured to filter an AC voltage signal; a rectifier module to rectify the filtered AC voltage signal to generate a DC voltage signal, the DC voltage signal proportional to the AC voltage signal; a voltage regulator module configured to determine that the DC voltage signal is above a threshold voltage level, and in response, clamp the DC voltage signal such that the clamped DC voltage signal i) is not proportional to the AC voltage signal and ii) is less than the threshold voltage level; a capacitor module to average peaks voltages of the clamped DC voltage signal; and a DC/DC converter to convert the averaged DC voltage signal to a converted DC voltage signal, the converted DC voltage signal having a desired DC voltage level.

17 Claims, 6 Drawing Sheets

SYSTEM AND METHOD FOR PROVIDING POWER SURGE PROTECTION IN A POWER SUPPLY UNIT FOR AN INFORMATION HANDLING SYSTEM

BACKGROUND

Field of the Disclosure

The disclosure relates generally to information handling systems, and specifically, providing power surge protection in a power supply unit for an information handling system

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In unstable power systems, AC adapters (power supply units) can fail. The worldwide AC input voltage to supply households is typically 100/110/115 volts AC to 230/240 volts AC. However, in the unstable power systems, the voltages can reach nearly 400 volts AC for approximately two seconds. These voltage spikes are sufficient to damage the power supply units.

SUMMARY

Innovative aspects of the subject matter described in this specification may be embodied in a power supply unit for an information handling system, including a filter module configured to filter an AC voltage signal; a rectifier module to rectify the filtered AC voltage signal to generate a DC voltage signal, the DC voltage signal proportional to the AC voltage signal; a voltage regulator module configured to determine that the DC voltage signal is above a threshold voltage level, and in response, clamp the DC voltage signal such that the clamped DC voltage signal i) is not proportional to the AC voltage signal and ii) is less than the threshold voltage level; a capacitor module to average peaks voltages of the clamped DC voltage signal; and a DC/DC converter to convert the averaged DC voltage signal to a converted DC voltage signal, the converted DC voltage signal having a desired DC voltage level.

These and other embodiments may each optionally include one or more of the following features. For instance, the voltage regulator module is further configured to determine that the DC voltage signal is less than the threshold voltage level, and in response, pass thru the DC voltage signal to the capacitor module. The voltage regulator module is further configured to, after the DC/DC converter converts the averaged DC voltage signal to the converted DC voltage signal, determine that the DC voltage signal is less than the threshold voltage level, and in response, pass thru the DC voltage signal to the capacitor module. The power supply unit further including a feedback control loop module to detect an error voltage of the converted DC voltage signal; and a pulse width modulator to, based on the error voltage, modulate the averaged DC voltage signal, wherein the DC/DC converter converts the modulated DC voltage signal to an updated converted DC voltage signal and output the updated converted DC voltage signal. The power supply unit further including an opto-coupler module to isolate the error voltage. The threshold voltage level is 373 volts. The threshold voltage level is 388 volts. The DC/DC converter includes one of a fly-back converter, a forward converter, a half-bridge converter, and a full-bridge converter.

Innovative aspects of the subject matter described in this specification may be embodied in a method for providing power surge protection in a power supply unit for an information handling system, including receiving an AC voltage signal; filtering and rectifying the AC voltage signal to generate a DC voltage signal, the DC voltage signal proportional to the AC voltage signal; determining that the DC voltage signal is above a threshold voltage level, and in response, clamping the DC voltage signal such that the clamped DC voltage signal i) is not proportional to the AC voltage signal and ii) is less than the threshold voltage level; averaging peak voltages of the clamped DC voltage signal; converting the averaged DC voltage signal to a converted DC voltage signal, the converted DC voltage signal having a desired DC voltage level; and outputting the converted DC voltage signal.

These and other embodiments may each optionally include one or more of the following features. For instance, determining that the DC voltage signal is less than the threshold voltage level, and in response, passing thru the DC voltage signal. After generating the converted DC voltage signal, determining that the DC voltage signal is less than the threshold voltage level, and in response, passing thru the DC voltage signal. Detecting an error voltage of the converted DC voltage signal; based on the error voltage, modulating the averaged DC voltage signal; converting the modulated DC voltage signal to an updated converted DC voltage signal; and outputting the updated converted DC voltage signal. Isolating the error voltage. Threshold voltage level is 373 volts. Threshold voltage level is 388 volts.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This document describes a power supply unit (PSU) for an information handling system. The PSU can include a filter module configured to filter an AC voltage signal; a rectifier module to rectify the filtered AC voltage signal to generate a DC voltage signal, the DC voltage signal proportional to the AC voltage signal; a voltage regulator module configured to determine that the DC voltage signal is above a threshold voltage level, and in response, clamp the DC voltage signal such that the clamped DC voltage signal i) is not proportional to the AC voltage signal and ii) is less than the threshold voltage level; a capacitor module to average peaks voltages of the clamped DC voltage signal; and a DC/DC converter to convert the averaged DC voltage signal to a converted DC voltage signal, the converted DC voltage signal having a desired DC voltage level.

The PSU can protect the capacitor module (and other components of the PSU) from damage due to excessive peak AC events (e.g., over specification). As a result, higher-cost capacitor modules are prevented (as well as other higher voltage components of the PSU) from being used in the PSU. This also affords enhanced reliability of the PSU, quality of the PSU, and reducing the overall cost of the PSU.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-6 wherein like numbers are used to indicate like and corresponding parts.

Figure 1:
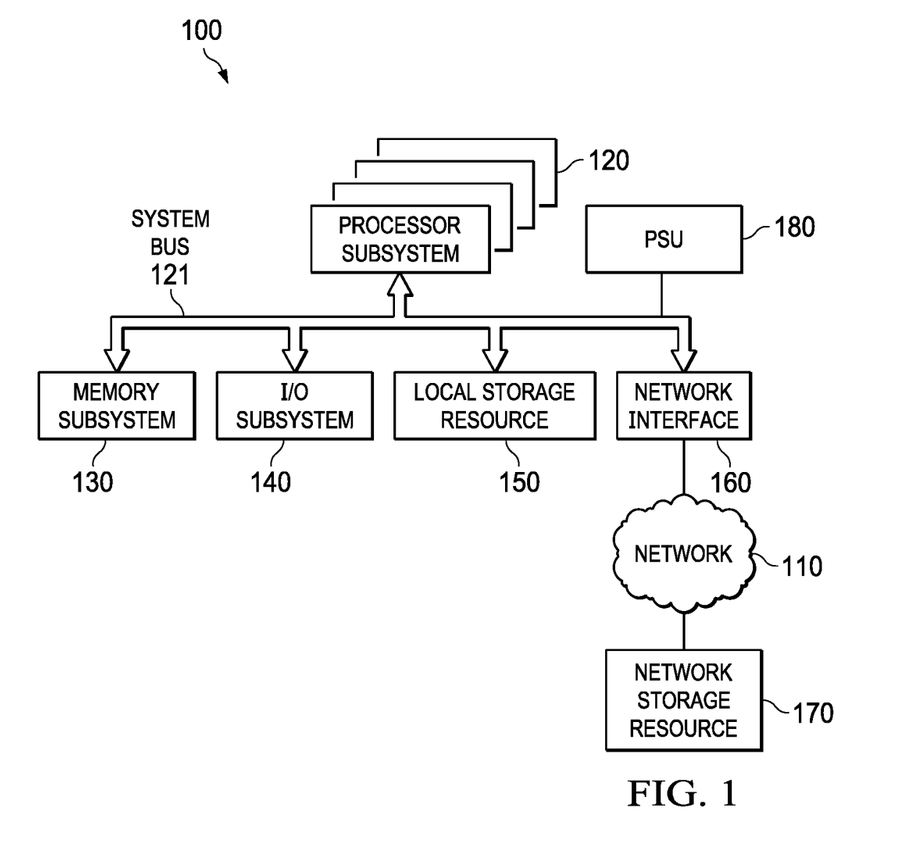
FIG. 1 is a block diagram of selected elements of an embodiment of an information handling system.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can further include a power supply unit (PSU) 180 that provides electrical power to one or more components of the information handling system 100. In some examples, the PSU 180 can include one or more power supply units.

Figure 2:
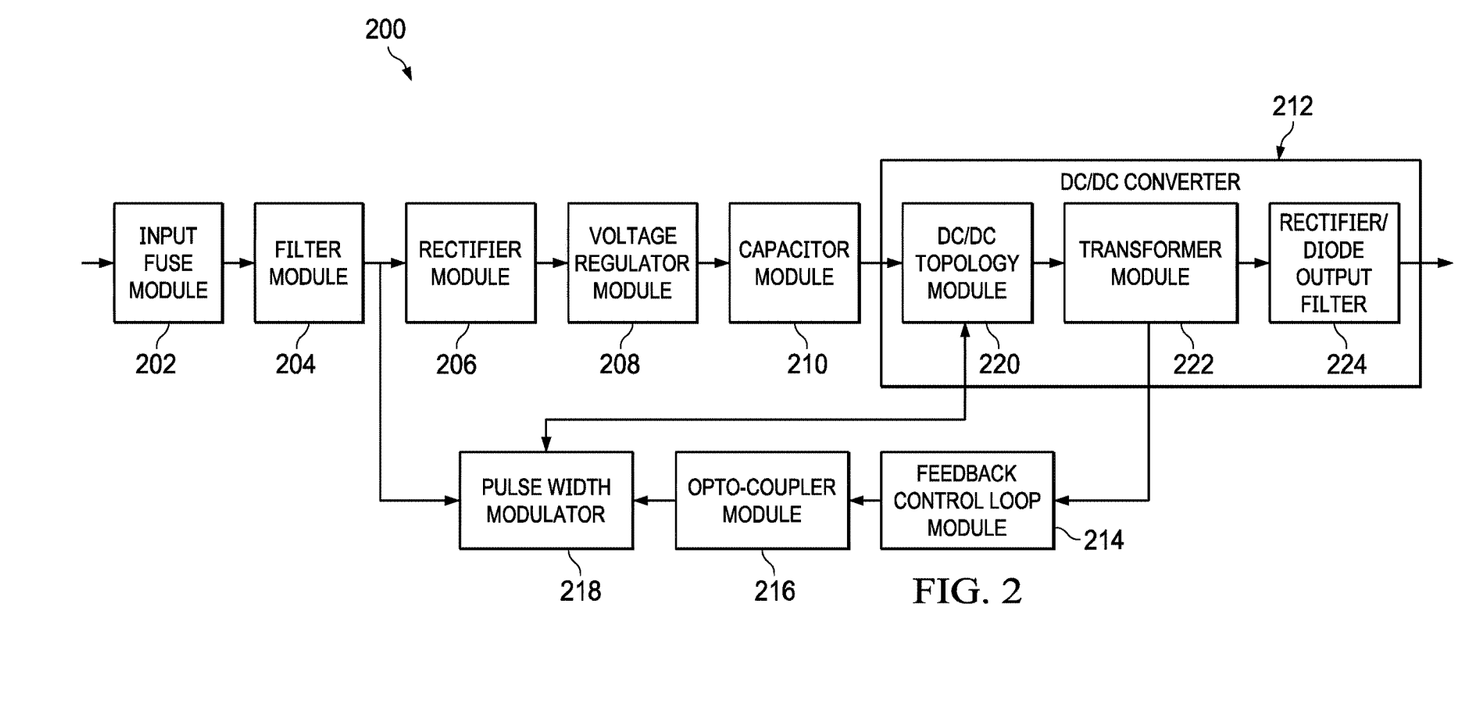
FIG. 2 illustrates a power supply unit (PSU) environment.

Turning now to FIG. 2, FIG. 2 illustrates a power supply unit (PSU) environment 200, or PSU 200. The PSU 200 can be similar to the PSU 180 of FIG. 1. The PSU 200 can include an input fuse module 202, a filter module 204, a rectifier module 206, a voltage regulator module 208, a capacitor module 210, a DC/DC converter 212, a feedback control loop module 214, an opto-coupler module 216, and a pulse width modulator 218. The DC/DC converter 212 can include a DC/DC topology module 220, a transformer module 222, and a rectifier/diode output filter 224. In an example, when the DC/DC topology module 220 includes a fly-back converter, the PSU 200 can produce a 20-volt signal, with power rates from 45 watts to 330 watts that operates from 85 to 265 input voltage. Other output voltages are possible by adjusting the turns of the transformer module 222. To that end, the PSU 200 can switch from pass-through function to supply input voltage to the DC/DC converter 212 during normal operation to clamp the input voltage during abnormal sources in AC to limit the voltage at the capacitor module 210 to be within safe levels to protect the PSU 200 from damage, described further herein.

In some examples, the input fuse module 202 receives an AC voltage signal (e.g., from a main electrical grid). The input fuse module 202 protects the PSU 200 from failure—e.g., the fuse would open up protecting the PSU 200. The filter module 204 receives the AC voltage signal from the input fuse module 202 and is configured to filter the AC voltage signal. In other words, the filter module 204 is responsible for filtering noise (e.g., switching noise) from going back to the main electrical grid. In some examples, the input fuse module 202 and the filter module 204 are a single module.

The rectifier module 206 receives the filtered AC voltage signal from the filter module 204. The rectifier module 206 is configured to rectify the filtered AC voltage signal to generate a DC voltage signal. In some examples, the rectifier module 206 can include a bridge rectifier that is a series of diodes that rectifies the filtered AC voltage signal. For example, the output of the rectifier module 206 can include sinusoidal pulses. In some examples, the DC voltage signal generated by the rectifier module 206 can be proportional to the AC voltage signal. For example, for an input AC voltage signal of 264 volts, the DC voltage signal can be 373 volts (e.g., scaled by a ratio of 1.414).

The voltage regulator module 208 receives the DC voltage signal from the rectifier module 206. The voltage regulator module 208 is configured to determine whether the DC voltage signal is above a threshold voltage level. In some examples, the voltage regulator module 208 can determine that the DC voltage signal is above the voltage threshold level. For example, when the input AC voltage signal is 400 volts, the DC voltage signal is 565 volts (e.g., 400 volts multiplied by the ratio 1.414 is approximately 565 volts). A DC voltage signal of 565 volts can exceed the component ratings (e.g., the components of the PSU 200 such as the capacitor module 210) and can be result in damage to the PSU 200. In some examples, the threshold voltage level is 388 volts. In some examples, the threshold voltage level is 373 volts.

To that end, when the voltage regulator module 208 determines that the DC voltage signal is above the DC voltage signal, the voltage regulator module 208 is configured to clamp the DC voltage signal to limit the DC voltage signal to protect the PSU 200. In some examples, the voltage regulator module 208 clamps the DC voltage signal such that the clamped DC voltage signal is i) not proportional to the AC voltage signal and ii) is less than the threshold voltage level. In other words, the voltage regulator module 208 switches to "clamping mode" to limit the voltage across the capacitor module 210—the DC voltage signal is clamped to a "safe value" (e.g., below the voltage rating of the components such as the capacitor module 210).

Figure 3A:
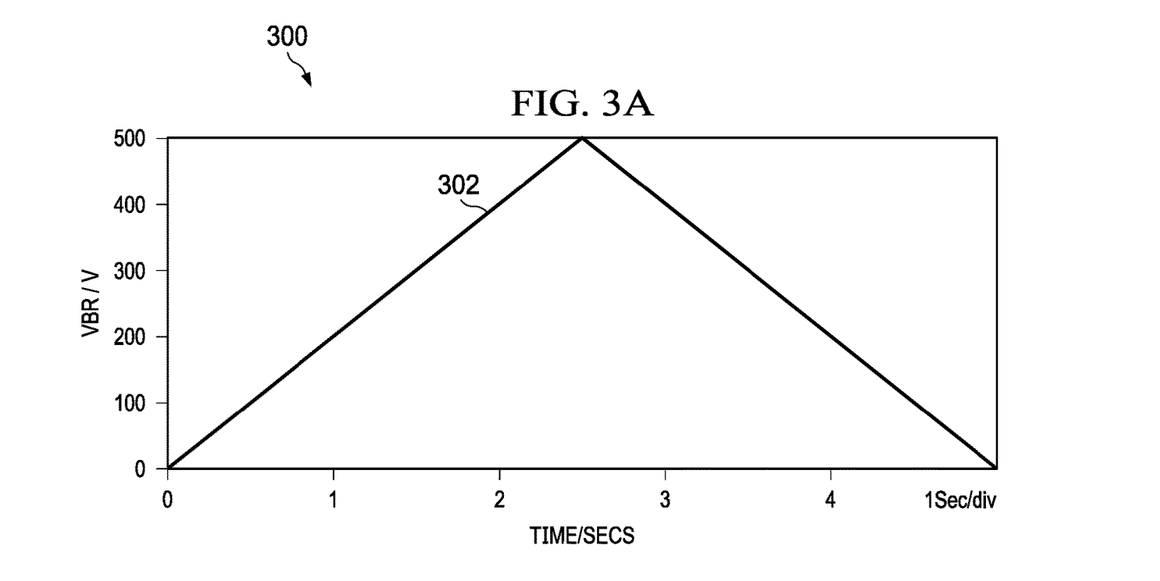
FIG. 3A illustrates a graph of a DC voltage signal that is input to the voltage regulator module.
Figure 3B:
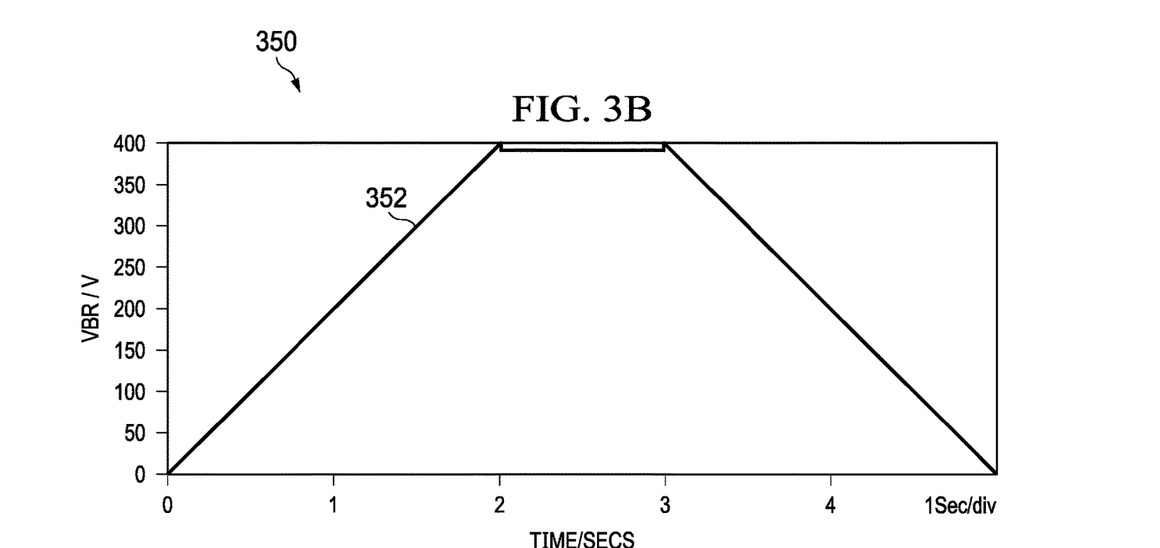
FIG. 3B illustrates a graph of a DC voltage signal that is output of the voltage regulator module.

FIG. 3A illustrates a graph 300 of a DC voltage signal 302 that is input to the voltage regulator module 208. The DC voltage signal 302 can have constant polarity, and have a voltage of 500 volts, which can be greater than the threshold voltage level. FIG. 3B illustrates a graph 350 of a DC voltage signal 352 that is output of the voltage regulator module 208—that is, the clamped DC voltage signal. The DC voltage signal can have a capped voltage level of 400 volts (between the time 2 seconds and 3 seconds). Thus, the clamped DC voltage signal 352 is not proportional to an input AC voltage signal (which the DC voltage signal 352 is converted from), and is not proportional the DC voltage signal 302.

Referring back to FIG. 2, in some examples, the voltage regulator module 208 can determine that the DC voltage signal is not above (or less than) the voltage threshold level. For example, when the input AC voltage signal is in the range of 90 volts to 264 volts, the DC voltage signal is between approximately 127 volts to 373 volts. A DC voltage signal between 127 and 373 volts does not exceed the component ratings (e.g., the components of the PSU 200 such as the capacitor module 210).

To that end, when the voltage regulator module 208 determines that the DC voltage signal is not above the DC voltage signal, the voltage regulator module 208 is configured to pass-thru the DC voltage signal to the capacitor module 210. In some examples, when the DC voltage signal is passed-thru to the capacitor module 210, there is no power loss, and no impact on the efficiency of the PSU 200.

In some examples, the capacitor module 210 receives the clamped DC voltage signal from the voltage regulator module 208. The capacitor module 210 can be configured to average the peak voltages of the clamped DC voltage signal. In other words, the capacitor module 210 averages the peak voltages of the clamped DC voltage signal to the average voltage of the sine wave. In other words, the capacitor module 210 averages the RMS value of the clamped DC voltage signal. In some examples, the capacitor module 210 receives the pass-thru DC voltage signal from the voltage regulator module 208. The capacitor module 210 can be configured to average the peak voltages of the pass-thru DC voltage signal, similar to the clamped DC voltage signal.

The DC/DC converter 212 can receive the averaged DC voltage signal from the capacitor module 210. The DC/DC converter 212 can be configured to convert the averaged DC voltage signal to a converted DC voltage signal. The DC/DC converter 212 can convert the averaged DC voltage signal— e.g., either the clamped DC voltage signal or the pass-thru DC voltage signal. Specifically, the DC/DC topology module 220 can represent common power topologies that can be employed with the PSU 200 such as a fly-back converter, a forward converter, a half-bridge converter, and a full-bridge converter. The transformer module 222 can convert the input DC voltage signal to generate the converted DC voltage signal having a desired DC voltage level (e.g., dependent on a desired application of the information handling system 100). The rectifier/diode output filter 224 can rectify the converted DC voltage signal to generate and output DC voltage signal.

The feedback control loop module 214 can receive the converted DC voltage signal from the DC/DC converter 212, and specifically, from the transformer module 222. The feedback control loop module 214 can be configured to detect an error voltage of the converted DC voltage signal. The opto-coupler module 216 can be configured to isolate the error voltage. The pulse width modulator 218 can receive the isolated error voltage, and based on the error voltage, modulate the averaged DC voltage signal. That is, the pulse width modulator 218 can be in communication with the DC/DC converter 212 to modulate the averaged DC voltage signal. The DC/DC converter 212 can convert the module DC voltage signal to an updated converted DC voltage signal and output the updated converted DC voltage signal.

In some examples, a voltage level of the input AC voltage signal can be adjusted after the DC/DC converter 212 generates the converted DC voltage signal. Specifically, the voltage regulator module 208 receives an additional DC voltage signal (e.g., from the rectifier module 206 in response to an additional AC input voltage signal). The voltage regulator module 208 can determine that the additional DC voltage signal is not above (or less than) the voltage threshold level. For example, when the additional input AC voltage signal is in the range of 90 volts to 264 volts, the additional DC voltage signal is between approximately 127 volts to 373 volts. An additional DC voltage signal between 127 and 373 volts does not exceed the component ratings (e.g., the components of the PSU 200 such as the capacitor module 210). To that end, when the voltage regulator module 208 determines that the additional DC voltage signal is not above the voltage threshold signal, the voltage regulator module 208 is configured to pass-thru the additional DC voltage signal to the capacitor module 210. In some examples, when the additional DC voltage signal is passed-thru to the capacitor module 210, there is no power loss, and no impact on the efficiency of the PSU 200.

Figure 4:
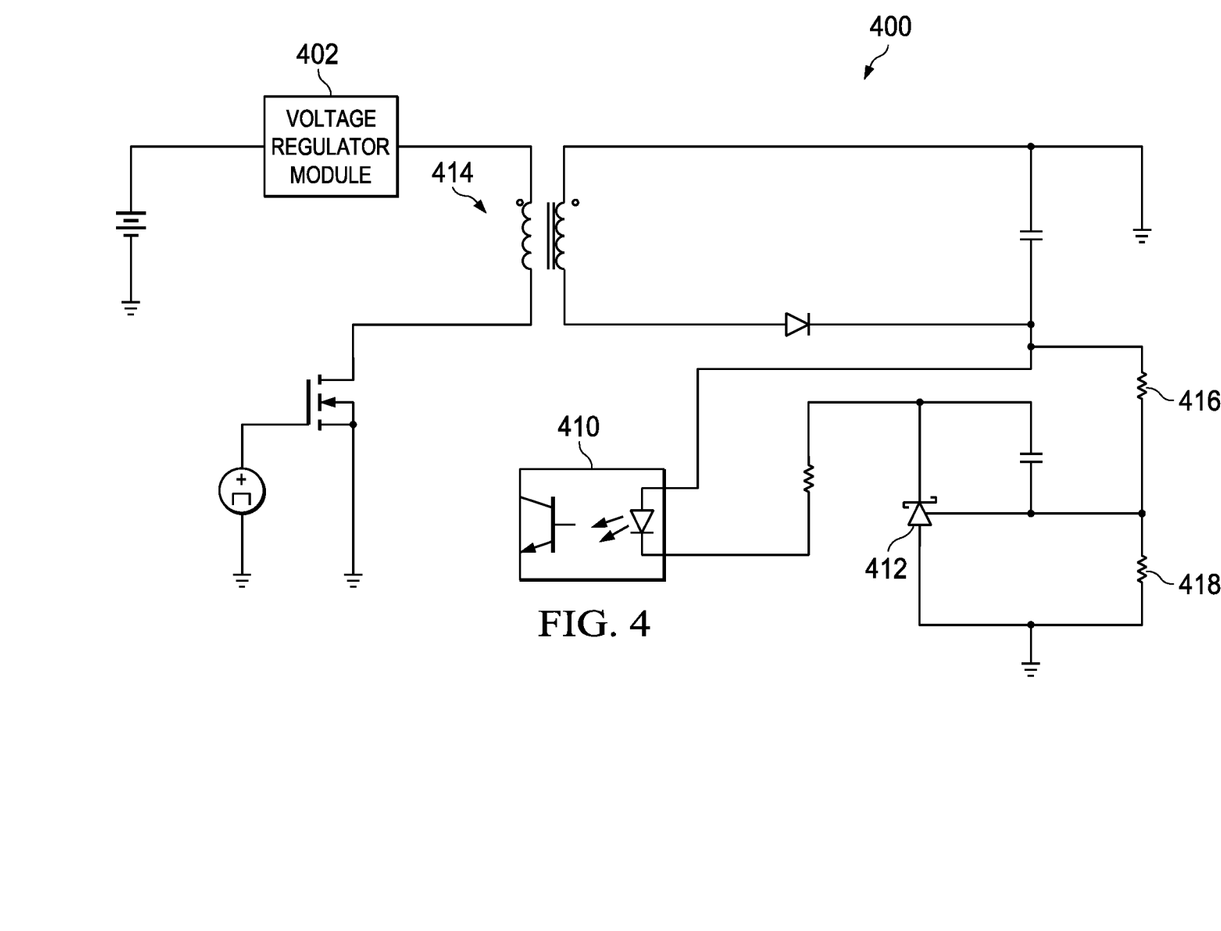
FIG. 4 illustrates a diagram of a fly-back converter including the voltage regulator module.

FIG. 4 illustrates a diagram of a fly-back converter 400 including a voltage regulator module 402, similar to the voltage regulator module 208 of FIG. 2. The converter 400 can generate an output of 20 volts with power rates from 45 watts to 330 watts that operates from 85 to 265 volts AC input voltage. The 20 volts can be directly sensed by the opto-coupler 410 and regulator 412. The output voltage can be determined by the regulator 412. Other output voltages are possible by adjusting the transform turns ratio and the value of the regulator 412. The input AC voltage signal can be rectified and filtered by the bridge rectifier diode and capacitor to create the high voltage DC bus on the capacitor, of which is applied across the primary winding of transformer 414. The regulator 412 can include a reference voltage (e.g., threshold voltage), and if the voltage at the junction of resistors 416, 418 is above the reference voltage, the regulator 412 redirects the current through the diode.

In some examples the converter 400 can include a primary side and a secondary side. The division between the primary side and the secondary side can be between the transformer 414 and the opto-coupler 410.

Figure 5:
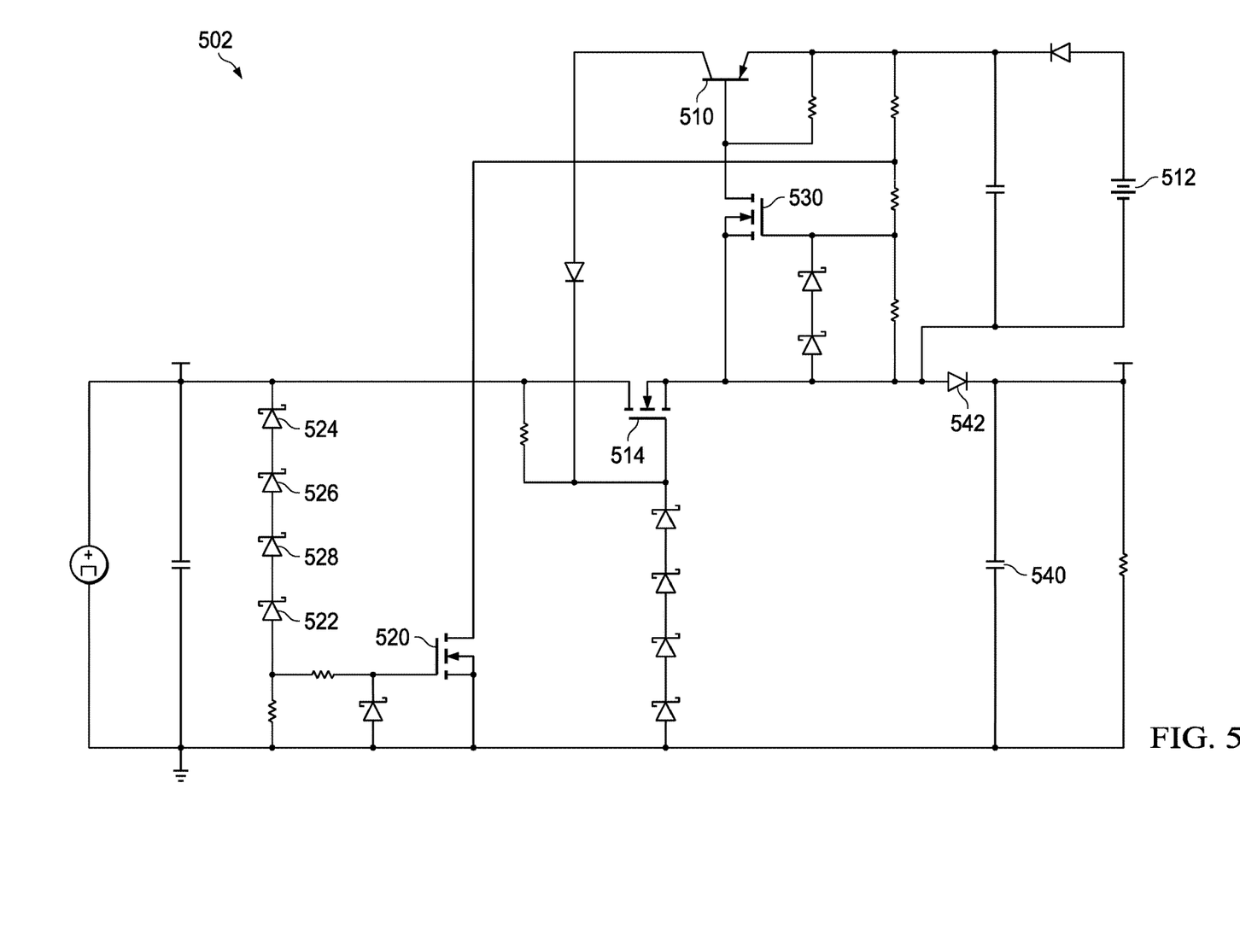
FIG. 5 illustrates a diagram of the voltage regulator module.

FIG. 5 illustrates a diagram of a voltage regulator module 502, similar to the voltage regulator module 208 of FIG. 2 and the voltage regulator module 402 of FIG. 4. The voltage regulator module 502 can have a normal operation range (pass-thru) from 90 volts to 264 volts (zero to two second per waveform). A transistor 510 can be enabled (turn on) such that there is enough voltage from the voltage source 512 to fully enable (turn on) a transistor 514 ($q2$). As a result, a rectified AC voltage input (90 volts AC-264 volts AC) will flow though transistor 514 to the fly-back topology to power the output. At this time, the transistor 514 is in pass-through ("normal" mode).

"Abnormal" operating range can include voltages greater than 264 volts (two to three seconds per waveform. A transistor 520 will be enabled (turn on) due to the Zener diodes 522, 524, 526, 528 conduction. When transistor 520 is enabled, transistor 530 will be activated (turn on), which will bias transistor 510 off, thus blocking voltage source 512 from transistor 514 and will no longer be saturated on state. At this time, transistor 514 enters linear regulation operation to limit capacitor 540 DC voltage to 400 volts DC. The maximum voltage of capacitor 540 is determined by the Zener diodes 522, 524, 526, 528, the gate-source voltage (VGS) of the transistor 514, and the voltage drop at diode 542.

The regulator module 502 can subsequently return to "normal" operation (three seconds per waveform). The transistor 514 can return to pass-through function from linear area operation as described above.

Figure 6:
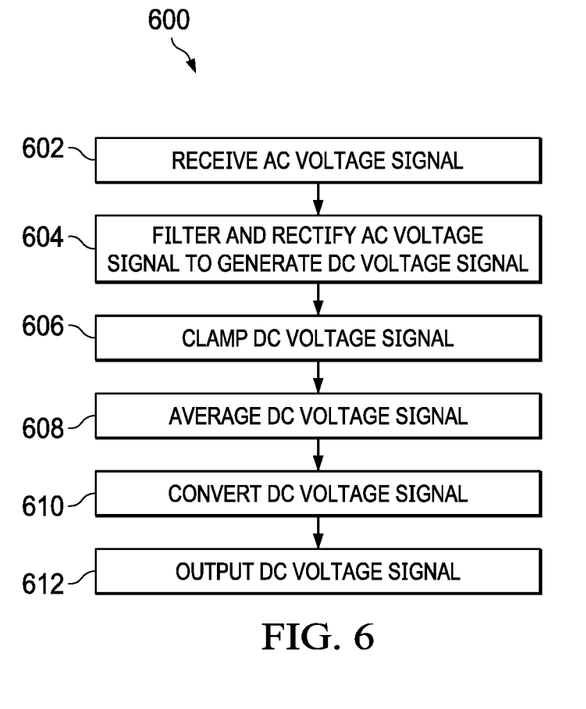
FIG. 6 illustrates a flowchart for providing power surge protection in a power supply unit for an information handling system.

FIG. 6 illustrates a flowchart depicting selected elements of an embodiment of a method 600 for providing power surge protection in a power supply unit for an information handling system. The method 600 may be performed by the power supply unit environment 200 described herein with reference to FIGS. 1-5, or another information handling system. It is noted that certain operations described in method 600 may be optional or may be rearranged in different embodiments.

The input fuse module 202 receives an AC voltage signal (e.g., from a main electrical grid) (602). The filter module 204 filters the AC voltage signal, and the rectifier module 206 rectifies the filtered AC voltage signal to generate a DC voltage signal (604). In some examples, the DC voltage signal generated by the rectifier module 206 can be proportional to the AC voltage signal. The voltage regulator module 208 determines that the DC voltage signal is above a threshold voltage level, and in response, the voltage regulator module 208 clamps the DC voltage signal such that the clamped DC voltage signal is i) not proportional to the AC voltage signal and ii) is less than the threshold voltage level (606). The capacitor module 210 averages the peak voltages of the clamped DC voltage signal (608). The DC/DC converter 212 converts the averaged DC voltage signal to a converted DC voltage signal (610). In some examples, the converted DC voltage signal has a desired DC voltage level. The DC/DC converter 212 can output DC voltage signal (612).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A power supply unit for an information handling system, comprising:
   a filter module configured to filter an AC voltage signal;
   a rectifier module to rectify the filtered AC voltage signal to generate a DC voltage signal, the DC voltage signal proportional to the AC voltage signal;
   a voltage regulator module configured to:
   a) determine, at a first time, that the DC voltage signal is above a threshold voltage level, and in response, clamp the DC voltage signal, for a first time period, such that the clamped DC voltage signal i) is not proportional to the AC voltage signal only for the first time period and ii) is less than the threshold voltage level;
   b) determine, at a second time after the first time, that the DC voltage input signal is below the threshold voltage level, and in response, pass thru the proportional DC voltage signal;
   a capacitor module to i) average peaks voltages of the clamped DC voltage signal at the first time and ii) average peak voltages of the proportional DC voltage signal at the second time; and
   a DC/DC converter to i) convert the averaged-clamped DC voltage signal to a converted-clamped DC voltage signal at the first time, the converted-clamped DC voltage signal having a desired DC voltage level, and ii) convert the averaged-proportional DC voltage signal to a converted-proportional DC voltage signal at the second time.

2. The power supply unit of claim 1, wherein the voltage regulator module is further configured to, before the DC/DC converter converts the averaged-clamped DC voltage signal to the converted-clamped DC voltage signal, determine that the DC voltage signal is less than the threshold voltage level, and in response, pass thru the DC voltage signal to the capacitor module.

3. The power supply unit of claim 1, further comprising:
a feedback control loop module to detect an error voltage of the converted-clamped DC voltage signal; and
a pulse width modulator to, based on the error voltage, modulate the averaged-clamped DC voltage signal,
wherein the DC/DC converter converts the modulated-clamped DC voltage signal to an updated converted-clamped DC voltage signal and output the updated converted-clamped DC voltage signal.

4. The power supply unit of claim 3, further comprising an opto-coupler module to isolate the error voltage.

5. The power supply unit of claim 1, wherein the threshold voltage level is 373 volts.

6. The power supply unit of claim 1, wherein the threshold voltage level is 388 volts.

7. The power supply unit of claim 1, wherein the DC/DC converter includes one of a fly-back converter, a forward converter, a half-bridge converter, and a full-bridge converter.

8. A method for providing power surge protection in a power supply unit for an information handling system, comprising
receiving an AC voltage signal;
filtering and rectifying the AC voltage signal to generate a DC voltage signal, the DC voltage signal proportional to the AC voltage signal;
determining, at a first time, that the DC voltage signal is above a threshold voltage level, and in response, clamping the DC voltage signal, for a first time period, such that the clamped DC voltage signal i) is not proportional to the AC voltage signal only for the first time period and ii) is less than the threshold voltage level;
averaging peak voltages of the clamped DC voltage signal;
converting the averaged-clamped DC voltage signal to a converted-clamped DC voltage signal, the converted-clamped DC voltage signal having a desired DC voltage level;
outputting the converted-clamped DC voltage signal;
after outputting the converted-clamped DC voltage signal, determining, at a second time after the first time, that the DC voltage input signal is below the threshold voltage level, and in response, passing thru the proportional DC voltage signal;
averaging peak voltages of the proportional DC voltage signal;
converting the averaged-proportional DC voltage signal to a converted-proportional DC voltage signal, the converted-proportional DC voltage signal having a desired DC voltage level;
outputting the converted-proportional DC voltage signal after outputting the converted-clamped DC voltage signal.

9. The method of claim 8, further comprising before generating the converted-clamped DC voltage signal, determining that the DC voltage signal is less than the threshold voltage level, and in response, passing thru the DC voltage signal.

10. The method of claim 8, further comprising:
detecting an error voltage of the converted DC voltage signal;
based on the error voltage, modulating the averaged-clamped DC voltage signal;
converting the modulated-clamped DC voltage signal to an updated converted-clamped DC voltage signal; and
outputting the updated converted-clamped DC voltage signal.

11. The method of claim 10, further comprising isolating the error voltage.

12. The method of claim 8, wherein the threshold voltage level is 373 volts.

13. The method of claim 8, wherein the threshold voltage level is 388 volts.

14. A power supply unit for an information handling system, comprising:
a filter module configured to filter an AC voltage signal;
a rectifier module to rectify the filtered AC voltage signal to generate a DC voltage signal, the DC voltage signal proportional to the AC voltage signal;
a voltage regulator module configured to:
a) determine, at a first time, that the DC voltage signal is above a threshold voltage level, and in response, clamp the DC voltage signal, for a first time period, such that the clamped DC voltage signal i) is not proportional to the AC voltage signal only for the first time period and ii) is less than the threshold voltage level;
b) determine, at a second time after the first time, that the DC voltage input signal is below the threshold voltage level, and in response, pass thru the proportional DC voltage signal;
a capacitor module to i) average peaks voltages of the clamped DC voltage signal at the first time and ii) average peak voltages of the proportional DC voltage signal at the second time; and
a DC/DC converter to i) convert the averaged-clamped DC voltage signal to a converted clamped DC voltage signal at the first time, the converted-clamped DC voltage signal having a desired DC voltage level, and ii) convert the averaged-proportional DC voltage signal to a converted-proportional DC voltage signal at the second time;
a feedback control loop module to detect an error voltage of the converted-clamped DC voltage signal; and
a pulse width modulator to, based on the error voltage, modulate the averaged-clamped DC voltage signal.

15. The power supply unit of claim 14, wherein the voltage regulator module is further configured to, before the DC/DC converter converts the averaged-clamped DC voltage signal to the converted-clamped DC voltage signal, determine that the DC voltage signal is less than the threshold voltage level, and in response, pass thru the DC voltage signal to the capacitor module.

16. The power supply unit of claim 15, further comprising an opto-coupler module to isolate the error voltage.

17. The power supply unit of claim 14, wherein the DC/DC converter is further configured to convert the modulated-clamped DC voltage signal to an updated converted-clamped DC voltage signal and output the updated converted-clamped DC voltage signal.

* * * * *